United States Patent
Abe

(10) Patent No.: US 9,854,153 B2
(45) Date of Patent: Dec. 26, 2017

(54) IMAGING APPARATUS, AND A METHOD OF CONTROLLING IMAGING APPARATUS USING AN IMAGING SURFACE CORRECTION MAP FOR PERFORMING CORRECTIONS

(71) Applicant: CANON KABUSHIKI KAISHA, Tokyo (JP)

(72) Inventor: Takahiro Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/183,157

(22) Filed: Jun. 15, 2016

(65) Prior Publication Data
US 2016/0373643 A1 Dec. 22, 2016

(30) Foreign Application Priority Data
Jun. 17, 2015 (JP) .................................. 2015-121742

(51) Int. Cl.
H04N 5/232 (2006.01)
H04N 5/77 (2006.01)

(52) U.S. Cl.
CPC ......... H04N 5/23212 (2013.01); H04N 5/772 (2013.01)

(58) Field of Classification Search
CPC ........................... H04N 5/23212; H04N 5/772
See application file for complete search history.

(56) References Cited

U.S. PATENT DOCUMENTS

| | | | | |
|---|---|---|---|---|
| 2005/0140815 A1* | 6/2005 | Nakano | ............. | H04N 5/23296 348/345 |
| 2011/0044677 A1* | 2/2011 | Oikawa | ............. | H04N 5/23212 396/121 |
| 2011/0273608 A1* | 11/2011 | Tsukada | ............. | H04N 5/23212 348/345 |
| 2014/0362276 A1* | 12/2014 | Hirose | ................. | H04N 5/3696 348/349 |
| 2015/0365583 A1* | 12/2015 | Higuma | ............. | H04N 5/23209 348/231.6 |

FOREIGN PATENT DOCUMENTS

JP 2014-126858 A 7/2014

* cited by examiner

*Primary Examiner* — Gevell Selby
(74) *Attorney, Agent, or Firm* — Cowan, Liebowitz & Latman, P.C.

(57) ABSTRACT

An imaging apparatus receive light fluxes passing through and incident on different pupil regions of an imaging optical system and generates at least image data of one pair of subject images. Imaging surface correction information regarding a manufacturing error or optical characteristics of design of an imaging lens is transmitted from a lens control unit of the imaging lens to a system control unit of a camera body, and then the system control unit receives the imaging surface correction information. The system control unit performs a process of generating a defocus map based on a parallax between at least one pair of images and performs imaging surface correction through correction of the calculated defocus amount. In the imaging surface correction process, influences of the optical characteristics of the imaging lens and an inclination of an imaging surface of an image sensor are corrected, and thus a more accurate distance map is generated.

13 Claims, 8 Drawing Sheets

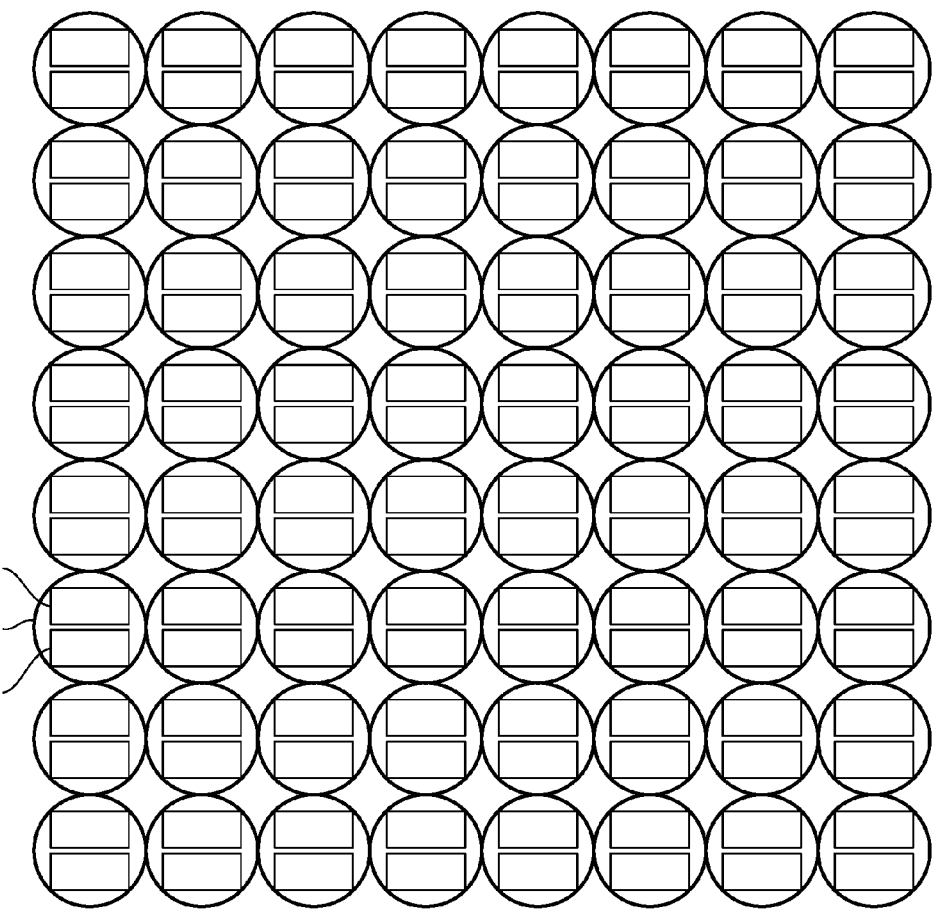
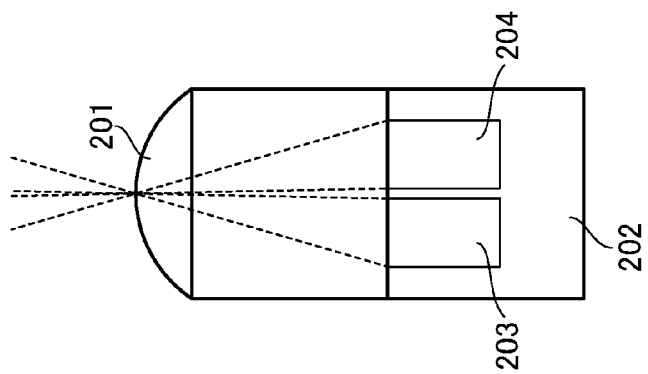
FIG. 2A
FIG. 2B

IMAGING APPARATUS, AND A METHOD OF CONTROLLING IMAGING APPARATUS USING AN IMAGING SURFACE CORRECTION MAP FOR PERFORMING CORRECTIONS

BACKGROUND OF THE INVENTION

Field of the Invention

The present invention relates to a technology for acquiring information regarding a distance of a subject in an imaging apparatus.

Description of the Related Art

Imaging apparatuses perform processes of generating distance maps indicating distributions of distances to subjects (hereinafter referred to as subject distances) based on captured images in order to acquire depth information regarding images. In these processes, it is necessary to improve detection precision of the subject distances. As factors deteriorating the detection precision, there are aberration of curvature of field or the like caused due to a manufacturing error or optical characteristics of design of an imaging lens, an influence of imaging surface flatness of an image sensor, and the like. When an imaging surface is not an ideal plane with no inclination, an error occurs in a subject distance. Hereinafter, an ideal flat imaging surface with no inclination is referred to as an "ideal imaging surface" and correction for approaching the ideal imaging surface is referred to as an "imaging surface correction."

Japanese Patent Laid-Open No. 2014-126858 discloses a technology for calculating a distribution of a subject distance in a photographing scene based on a focus evaluation value obtained through AF (automatic focus adjustment) scan. According to the position of a focus detection region, correction amounts of aberration of curvature of field or the like caused due to a manufacturing error or optical characteristics of design of an imaging lens and imaging surface flatness of an image sensor are calculated. By detecting a focus lens position at which a focus evaluation value is peak for each focus detection region and correcting the focus lens position according to the position of the focus detection region, it is possible to improve precision of the distribution of the subject distance.

In Japanese Patent Laid-Open No. 2014-126858, a process of calculating and correcting a defocus correction amount of an imaging surface is performed by approximating imaging surface characteristics due to a manufacturing error or optical characteristics of design of an imaging lens, and imaging surface flatness of an image sensor by a quadratic function. The quadratic function for the calculation of the correction amounts has no coefficients corresponding to imaging surface characteristics due to a manufacturing error or optical characteristics of design of an imaging lens and imaging surface flatness of an image sensor. That is, because of an added coefficient, the technology is assumed to be applied to a lens integrated type imaging apparatus. In contrast, in a lens interchangeable type imaging apparatus in which a lens device is mounted on a camera body for use, when a combination of an imaging lens and the camera body is changed, a correction amount of an imaging surface has to be calculated according to the combination. For this reason, it is necessary to separately have imaging surface correction information of an imaging lens and imaging surface correction information of an image sensor.

SUMMARY OF THE INVENTION

According to the present invention, detection precision of defocus information is improved in an imaging apparatus on which a lens device can be detachably mounted.

An apparatus according to an embodiment of the present invention is an imaging apparatus on which a lens device is able to be detachably mounted. The imaging apparatus includes: an imaging unit configured to include a plurality of photoelectric conversion units that receive light fluxes passing through and incident on different pupil regions in an imaging optical system of the lens device and output a plurality of signals; a calculation unit configured to acquire the signals output by the plurality of photoelectric conversion units and calculate a defocus amount; and a correction unit configured to correct the defocus amount calculated by the calculation unit. The correction unit performs imaging surface correction by correcting the defocus amount using correction information regarding optical characteristics of the lens device and correction information regarding an inclination of an imaging surface of the imaging unit.

Further features of the present invention will become apparent from the following description of exemplary embodiments with reference to the attached drawings.

BRIEF DESCRIPTION OF THE DRAWINGS

FIGS. 2A and 2B are diagrams illustrating an example of the configuration of a pupil split type image sensor according to an embodiment of the present invention.

DESCRIPTION OF THE EMBODIMENTS

Hereinafter, preferred embodiments of the present invention will be described in detail with reference to the drawings. An example in which an image processing device according to each embodiment is applied to a digital camera on which a lens device can be detachably mounted will be described.

First Embodiment

An example of the configuration of a lens interchangeable type digital camera will be described according to a first embodiment of the present invention. The digital camera includes a pupil split type image sensor and generates a defocus map by phase difference detection. The defocus map is information indicating a distribution of a defocus amount representing a difference between a light reception surface and an imaging surface of a lens. Hereinafter, an imaging surface correction process related to optical characteristics of an imaging lens and imaging surface flatness of an image sensor will be described. In the embodiment, imaging surface correction information regarding optical characteristics of an imaging lens and imaging surface correction information regarding imaging surface flatness (an inclination of an imaging surface) of an image sensor are assumed to be acquired.

Figure 1:
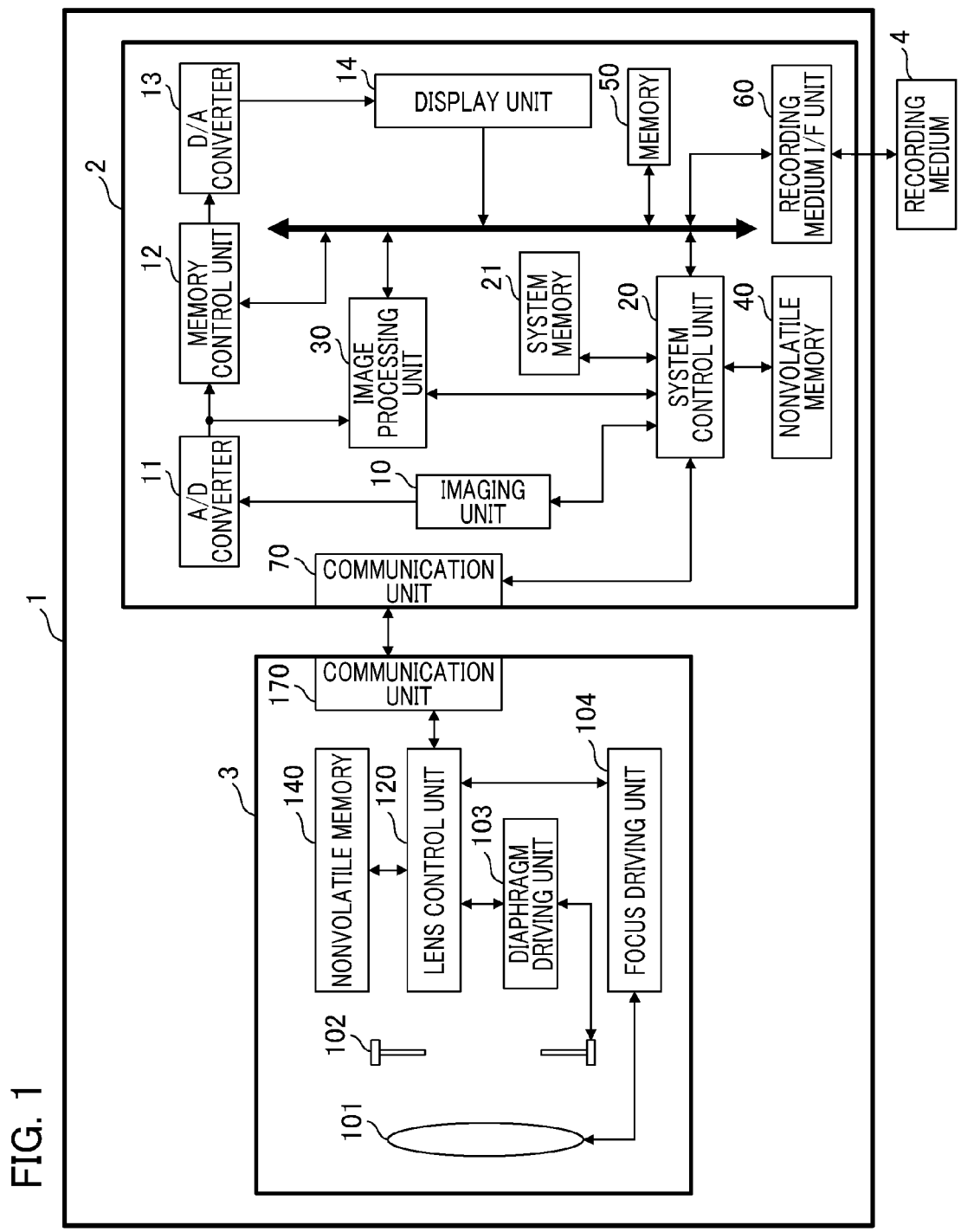
FIG. 1 is a diagram illustrating an example of the configuration of the imaging apparatus according to an embodiment of the present invention.

FIG. 1 is a block diagram illustrating an example of the configuration of a lens interchangeable type digital camera 1 according to the embodiment. The digital camera 1 is configured to include a camera body 2 and an imaging lens 3 which can be detachably mounted. The camera body 2 and the imaging lens 3 are physically connected in a lens mounting unit (not illustrated) so that a communication unit 70 communicates with a communication unit 170.

The imaging lens 3 includes a diaphragm 102 and a focus lens 101 forming an imaging optical system. A diaphragm driving unit 103 drives the diaphragm 102 to adjust a diaphragm value. A focus driving unit 104 performs focus adjustment by moving a focus lens 101 in an optical axis direction of the imaging optical system. A lens control unit 120 controls the entire imaging lens 3. The lens control unit 120 performs focus adjustment control by outputting a control signal to the focus driving unit 104 and moving the focus lens 101. The lens control unit 120 controls a diaphragm value (F value) by outputting a control signal to the diaphragm driving unit 103 and driving the diaphragm 102.

A nonvolatile memory 140 is a memory capable of electrically erasing and recording data. For example, an electrically erasable programmable read-only memory (EEPROM) is used. A constant for an operation of the lens control unit 120, information regarding optical characteristics or correction information of the imaging lens 3, and the like are stored in the nonvolatile memory 140. The information regarding the optical characteristics is information indicating optical characteristics of design of the imaging lens 3 used for imaging surface correction to be described below. The correction information is imaging surface correction information regarding a manufacturing error. The communication unit 170 transmits a focus distance of the imaging lens 3, the imaging surface correction information regarding the imaging lens 3 used for the imaging surface correction and the like to the communication unit 70 of the camera body 2.

An imaging unit 10 includes an image sensor that converts an optical image of a subject into an electric signal. The image sensor is an area image sensor configured of, for example, a charge couple device (CCD) or a complementary metal oxide semiconductor (CMOS) element. The configuration of the imaging unit 10 will be described with reference to FIGS. 2A and 2B.

FIG. 2A exemplifies a pixel array of the imaging unit 10. FIG. 2A illustrates a state when viewed from the side of the imaging optical system in a range of 8 columns and 8 rows in a 2-dimensional image sensor. A Bayer array is applied to color filters. In pixels in odd rows, green (G) and red (R) color filters are alternately provided sequentially from the left side. In pixels in even rows, blue (B) and green (G) color filters are alternately provided sequentially from the left side.

FIG. 2B is a diagram illustrating an expanded cross-sectional structure of one certain pixel unit 202. The pixel unit 202 is configured to include a microlens 201 and a pair of photoelectric conversion units 203 and 204 receiving incident light and converting the incident light into electric signals. In the embodiment, a first image corresponding to an image signal subjected to photoelectric conversion by the photoelectric conversion unit 203 is assumed to be an image A. A second image corresponding to an image signal subjected to photoelectric conversion by the photoelectric conversion unit 204 is assumed to be an image B. Normal photographed image data is generated by adding pieces of data of the images A and B. The splitting direction of the photoelectric conversion units and the number of splittings can be changed arbitrarily according to a specification.

An analog (A)/digital (D) converter 11 in FIG. 1 converts an analog signal acquired from the imaging unit 10 into a digital signal. The A/D converter 11 outputs the converted digital signal to an image processing unit 30. The image processing unit 30 performs predetermined pixel interpolation, a resizing process such as reduction, and a color conversion process on data from the A/D converter 11 or data from the memory control unit 12. The image processing unit 30 performs a predetermined calculation process using data of a captured image. A system control unit 20 performs exposure control or focus detection and focus adjustment control based on a calculation result. Accordingly, an automatic exposure (AE) process, an automatic white balance (AWB) process, an auto focus (AF) process are performed. The image processing unit 30 detects a relative image deviation amount of the images A and B through correlation calculation (phase difference detection scheme). The AF process is performed so that the image deviation amount by the correlation calculation is minimized. The image processing unit 30 calculates defocus information corresponding to a subject distance. An overview of the calculation process will be described with reference to FIG. 3.

Figure 3:
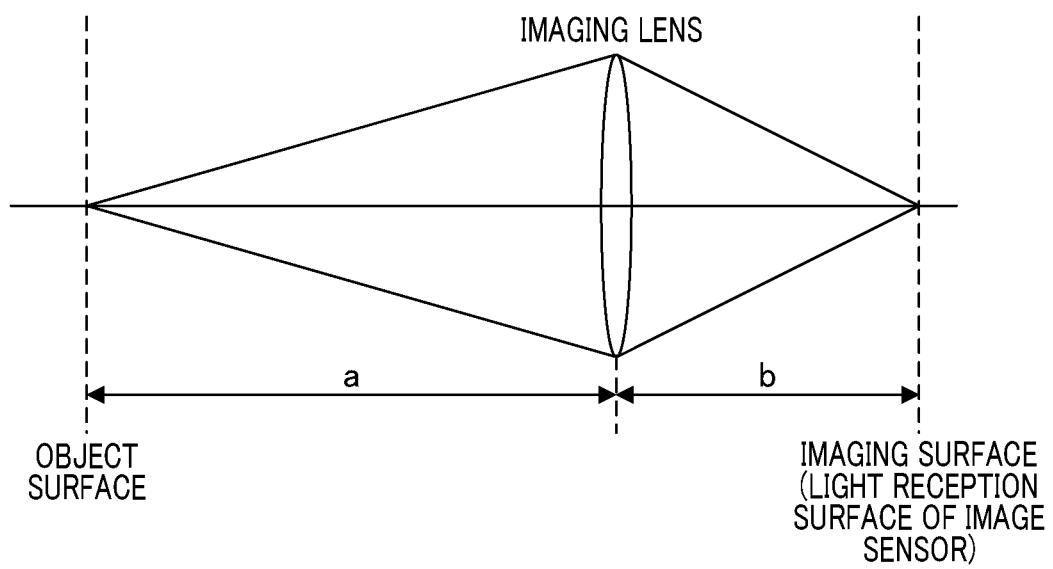
FIG. 3 is an explanatory diagram illustrating a lens formula used to calculate a subject distance according to an embodiment of the present invention.

FIG. 3 is a schematic diagram illustrating a positional relation between an object surface, an imaging lens, and an imaging surface. The imaging surface corresponds to a light reception surface of the image sensor. A distance between the object surface and the imaging lens is notated as a, a distance between the imaging lens and the imaging surface is notated as b, and a focus distance of the imaging lens is notated as f. The distance a to a subject focused by the AF process can be calculated using a lens formula expressed below (expression 1).

$$\frac{1}{a}+\frac{1}{b}=\frac{1}{f} \quad \text{(Expression 1)}$$

The image processing unit 30 calculates a defocus amount (notated as DEF) of a subject with respect to the imaging surface using an image deviation amount (notated as x) of the images A and B calculated through the correlation calculation by the following expression (expression 2).

$$DEF = KX \cdot PY \cdot x \quad \text{(Expression 2)}$$

In expression (2), KX is a conversion coefficient decided by the magnitude of an angle of aperture at the centers of gravity of light fluxes passing through one pair of pupil regions and its unit is "mm/pixel." Since the magnitude of the angle of aperture at the centers of gravity of the light fluxes passing through one pair of pupil regions is changed according to the magnitude (F value) of a diaphragm aperture of the lens, the magnitude is decided according to lens information. PY is a pixel pitch (inter-pixel distance) of the image sensor. A process of calculating the defocus amount is performed by shifting the position of a pixel of interest pixel by pixel, and thus a defocus map indicating a distribution of the defocus amount regarding a subject is generated. The image processing unit 30 generates a distance map indicating a distribution of distance information of the subject from the generated defocus map and the lens formula.

Data output by the A/D converter 11 is written on a memory 50 via the image processing unit 30 and the memory control unit 12. The memory 50 stores digital image data subjected to the A/D conversion or image data to be displayed by a display unit 14. The memory 50 has a sufficient storage capacity to store a predetermined number of still images or a moving image and audio data for a predetermined photographing time. The memory 50 also serves as a video memory for image display.

A D/A converter 13 converts image display data stored in the memory 50 into an analog signal and outputs the analog signal to the display unit 14. The display unit 14 acquires the display image data read from the memory 50 by the memory control unit 12 and displays the display image data on a screen. A nonvolatile memory 40 is a memory capable of electrically erasing and recording data. For example, an EEPROM is used. The nonvolatile memory 40 stores a constant for operation of the system control unit 20, a program, and the like. The program mentioned herein is a program for performing processes illustrated in various flowcharts to be described below in the embodiment. The nonvolatile memory 40 stores the imaging surface correction information regarding imaging surface flatness of an image sensor used for imaging surface correction to be described below.

The system control unit 20 is a core unit that controls the entire digital camera 1 and includes a central processing unit (CPU). The CPU reads and executes a program stored in the nonvolatile memory 40 to realize each process such as imaging surface correction to be described below. In a system memory 21, a random access memory (RAM) is used. The system memory 21 stores a constant and a variable for an operation of the system control unit 20, a program read from the nonvolatile memory 40 to be loaded, and the like.

A recording medium 4 records, for example, image data subjected to an imaging process. The recording medium 4 is configured of, for example, a memory card, a semiconductor memory, or a magnetic disk. A recording medium I/F unit 60 is an interface unit that transmits and receives signals to and from the recording medium 4.

Figure 4:
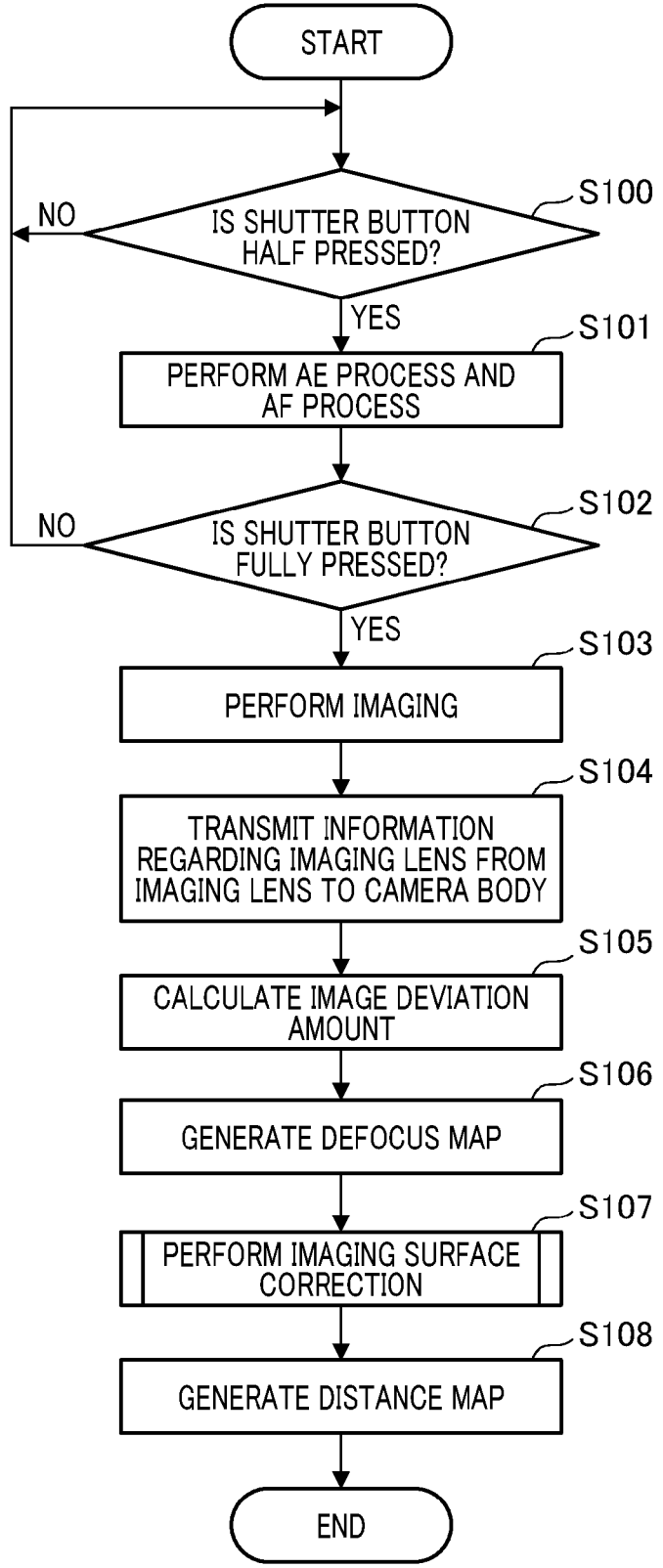
FIG. 4 is a flowchart illustrating an example of a process according to a first embodiment of the present invention.

Next, the flow of the processes according to the embodiment will be described with reference to FIG. 4. FIG. 4 is a flowchart illustrating an example of a series of processes from photographing to the imaging surface correction. The following processes are realized when the CPU of the system control unit 20 interprets and executes a program.

The system control unit 20 determines whether a shutter button (not illustrated) is half pressed through a user manipulation (step S100). When the shutter button is half pressed, the process proceeds to of S101. When the shutter button is not half pressed, the determination process of S100 is repeated. In S101, the system control unit 20 performs control of an AE process, an AF process, an AWB process, and the like. Subsequently, the system control unit 20 determines whether the shutter button is fully pressed through a user manipulation (S102). When it is determined that the shutter button is fully pressed, the process proceeds to S103. When it is determined that the shutter button is not fully pressed, the process returns to S100.

In S103, the system control unit 20 performs control of a photographing operation and allows the process to proceed to S104. The system control unit 20 requests the lens control unit 120 to transmit the following data:

a focus distance of the imaging lens 3 at the time of photographing;

information regarding the optical characteristics of design of the imaging lens 3; and imaging surface correction information regarding a manufacturing error of the imaging lens 3.

The lens control unit 120 transmits the requested data to the system control unit 20. Then, the system control unit 20 receives the data from the imaging lens 3 (S104). In S105, the system control unit 20 causes the image processing unit 30 to calculate the relative image deviation amount of the images A and B through the correlation calculation. The pixels to be subjected to the correlation calculation are decided according to a resolution or the number of pixels of the generated distance map. Then, the system control unit 20 causes the image processing unit 30 to calculate the defocus amount DEF from the relative image deviation x of the images A and B using (expression 2) and generates the defocus map (S106). The system control unit 20 causes the image processing unit 30 to perform the imaging surface correction (S107). The details of the imaging surface correction will be described below.

Subsequently, the system control unit 20 calculates the subject distance for each pixel of the defocus map based on the focus distance and the defocus map corrected by the image processing unit 30. When the distance map is generated (S108), the process ends.

Next, the imaging surface correction process of S107 in FIG. 4 will be described in detail. Hereinafter, a rectangular coordinate system in which the center of an image is used as the origin is assumed to be used as 2-dimensional coordinates (x, y).

In the embodiment, imaging surface characteristics decided according to the optical characteristics of the design of the imaging lens 3 are assumed to be expressed by a quadratic function. When the imaging surface characteristics due to a manufacturing error and the optical characteristics of the design of the imaging lens 3 are approximated by the quadratic function in consideration of deviation in an optical axis caused due to a manufacturing error, the imaging surface characteristics can be expressed as in (expression 3) and (expression 4). An imaging surface correction amount for the imaging surface characteristics due to a manufacturing error and the optical characteristics of the design of the imaging lens 3 is notated by $Z_1$.

$$Z_1(x,y) = a_1 \cdot r^2 + b_1 \cdot r + c_1 \cdot x + d_1 \cdot y + e_1 \quad \text{(Expression 3)}$$

$$r^2 = x^2 + y^2 \quad \text{(Expression 4)}$$

Here, $a_1$, $b_1$, $c_1$, $d_1$, and $e_1$ are coefficients expressed in (expression 3). The values of the coefficients $a_1$, $b_1$, $c_1$, $d_1$, and $e_1$ according to photographing conditions such as a diaphragm value, a zoom position, and a subject distance are measured beforehand and coefficient values are stored in the nonvolatile memory 140. In photographing conditions in which coefficient values are not measured beforehand, conditions proximate to the photographing conditions in which the coefficient values are measured beforehand are selected. Then, coefficient values are generated by performing linear interpolation.

When the imaging surface flatness of the image sensor is approximated on a plane, the imaging surface flatness can be expressed as in (expression 5). The imaging surface correction amount for the imaging surface flatness of the image sensor is notated as $Z_2$.

$$Z_2(x,y) = c_2 \cdot x + d_2 \cdot y + e_2 \quad \text{Expression 5}$$

Here, $c_2$, $d_2$, and $e_2$ in (expression 5) are coefficients. The values of the coefficients $c_2$, $d_2$, and $e_2$ are measured beforehand and coefficient values are stored in the nonvolatile memory 40. The values of the coefficients $c_2$, $d_2$, and $e_2$ can be calculated by measuring distances of flange backs of coordinates of a plurality of spots by a laser ranging meter and performing plane approximation by the least squares method or the like.

The coordinates at which a subject is focused are written as x=p and y=q and a sum of imaging surface correction amounts $Z_1(p, q)$ and $Z_2(p, q)$ is defined as g as in (expression 6). An imaging surface correction amount $Z_3(x, y)$ is calculated from (expression 7). Here, g is subtracted from the sum of imaging surface correction amounts $Z_1(x, y)$ and $Z_2(x, y)$ to realize an ideal imaging surface on which coordinates (p, q) in focus are used as a reference so that a defocus amount is 0 at the coordinates (p, q) at which a subject is focused. That is, the correction is performed using g as a reference.

$$g = Z_1(p,q) + Z_2(p,q) \quad \text{Expression 6}$$

$$Z_3(x,y) = Z_1(x,y) + Z_2(x,y) - g = a_1 \cdot r^2 + b_1 \cdot r + (c_1 + c_2) \cdot x + (d_1 + d_2) \cdot y + (e_1 + e_2) - g \quad \text{Expression 7}$$

FIGS. 5A to 5E illustrate examples of the imaging surface correction. FIG. 6 is a schematic diagram illustrating a state in which a plane chart 601 is disposed in front of the digital camera 1 so that the entire region of a view angle is equidistant. FIGS. 5A to 5E illustrate examples of the imaging surface correction by an image captured by facing the plane chart 601 and the digital camera 1, as illustrated in FIG. 6. Hereinafter, a defocus map is notated as DM. A first imaging surface correction map which is calculated by shifting the position of a pixel of interest pixel by pixel and which is formed from data of the imaging surface correction amount $Z_1$ regarding the optical characteristics or a manufacturing error, or the optical characteristics and a manufacturing error is referred to as an imaging surface correction map $ZM_1$ regarding an imaging lens. A second imaging surface correction map which is calculated by shifting the position of a pixel of interest pixel by pixel and which is formed from data of the imaging surface correction amount $Z_2$ regarding the imaging surface flatness of the image sensor is referred to as an imaging surface correction map $ZM_2$ of the image sensor. A third imaging surface correction map which is calculated by shifting the position of a pixel of interest pixel by pixel and is formed of data of the imaging surface correction amount $Z_3$ after addition combination is referred to as an imaging surface correction map $ZM_3$. A defocus map after the imaging surface correction is notated as $DM_{mod}$.

Figure 5A:
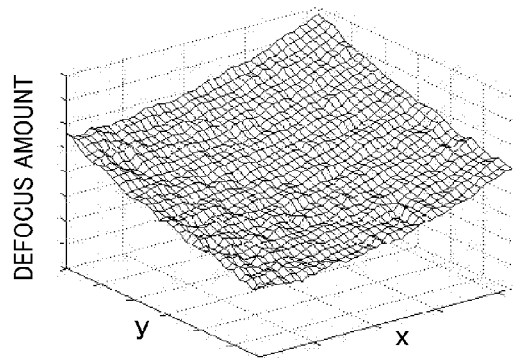
FIGS. 5A, 5B, 5C, 5D, and 5E are diagrams for describing an imaging surface correction example according to the first embodiment of the present invention.
Figure 5B:
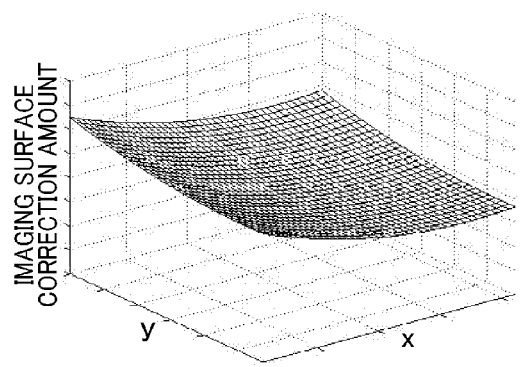
Figure 5C:
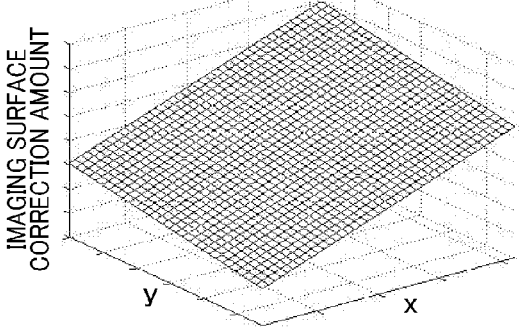
Figure 5D:
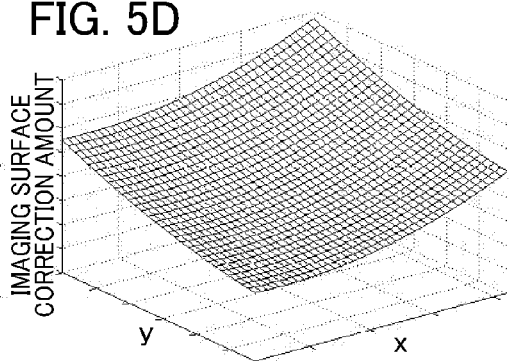
Figure 5E:
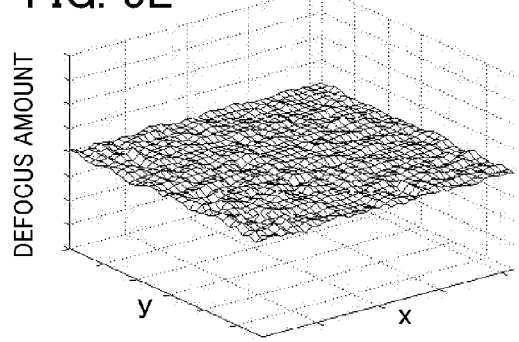
Figure 6:
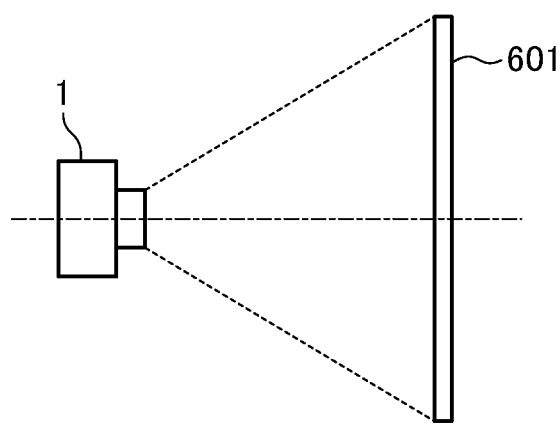
FIG. 6 is a concept diagram illustrating a disposition example of an imaging apparatus and a plane chart according to an embodiment of the present invention.

FIG. 5A exemplifies the defocus map DM before the imaging surface correction. The axis in the vertical direction to the x and y axes of a 2-dimensional coordinate system represents the defocus amount. FIG. 5B exemplifies the imaging surface correction map $ZM_1$ of the imaging lens. The axis in the vertical direction to the x and y axes of a 2-dimensional coordinate system represents the value of $ZM_1$ approximated by a quadratic function. FIG. 5C exemplifies the imaging surface correction map $ZM_2$ of the image sensor. The axis in the vertical direction to the x and y axes of a 2-dimensional coordinate system represents the value of $ZM_2$ approximated on a plane. FIG. 5D exemplifies the imaging surface correction map $ZM_3$. The axis in the vertical direction to the x and y axes of a 2-dimensional coordinate system represents the value of $ZM_3$ calculated by (expression 7). FIG. 5E exemplifies the defocus map $DM_{mod}$ after the imaging surface correction. The axis in the vertical direction to the x and y axes of a 2-dimensional coordinate system represents the defocus amount after the imaging surface correction is performed using $ZM_3$.

In the embodiment, when a combination of the imaging lens and the camera body is changed, detection precision of the defocus map can be improved through the imaging surface correction. Accordingly, in a lens interchangeable imaging apparatus, it is possible to improve the detection precision of a subject distance. In the embodiment, the process of generating the distance map inside the camera body after photographing has been described, but the present invention is not limited to such an example. For example, in the system control unit 20, the recording medium I/F unit 60 performs a process of recording imaging surface correction information regarding a lens and a camera along with raw image data as metadata which is supplementary information of the image data in the recording medium 4. An external apparatus, a computer, or the like connected to the imaging apparatus acquires the image data and the metadata and performs the imaging surface correction process to generate a distance map. The same also applies to embodiments to be described below.

Second Embodiment

Next, a second embodiment of the present invention will be described. In the embodiment, an imaging lens with optical characteristics in which an influence of imaging surface characteristics due to a manufacturing error is small is set as a target. A case in which correction information regarding optical characteristics of an imaging lens is only designed values will be described. The configuration or the like of the apparatus is the same as that according to the first embodiment. Therefore, the detailed description thereof will be omitted and the reference numerals used above will be used. Such detailed description will also be omitted in embodiments to be described below.

When an influence of the optical characteristics due to a manufacturing error on the imaging lens 3 is small, imaging surface correction information of the imaging lens 3 can be set as correction information regarding only optical characteristics of lens design. That is, the imaging surface correction information regarding a manufacturing error is unnecessary. Therefore, by storing only information regarding the optical characteristics of the lens design in the nonvolatile memory 140, it is possible to reduce a storage capacity of the nonvolatile memory 140. Data of design values of the optical characteristics may be stored in the nonvolatile memory 40 of the camera body 2. The imaging surface correction can be performed on an imaging lens in which a manufacturing error is not measured.

When the data of the optical characteristics of the design of the imaging lens 3 is stored in the nonvolatile memory 140 of the imaging lens 3, the imaging surface correction can be performed through the same process as that of the first embodiment. When the data of the optical characteristics of the design of the imaging lens 3 is stored in the nonvolatile memory 40 of the camera body 2, the imaging surface correction information regarding the optical characteristics of the design of the imaging lens 3 is read from the nonvolatile memory 40 in S104 of FIG. 4. The imaging surface correction amount regarding the optical characteristics of the design of the imaging lens 3 is calculated by performing the same calculation as (expression 3). The defocus map $DM_{mod}$ is generated by performing the imaging surface correction using the imaging surface correction amount.

In the embodiment, the imaging surface correction can be performed based on the imaging surface correction information regarding the imaging surface flatness of the image sensor and the optical characteristics of the design of the imaging lens.

Third Embodiment

A process of calculating imaging surface correction information regarding imaging surface flatness of an image sensor according to a third embodiment of the present invention will be described. In the embodiment, the imaging surface correction information regarding a manufacturing error and the optical characteristics of the imaging lens is assumed to be acquired.

Figure 7:
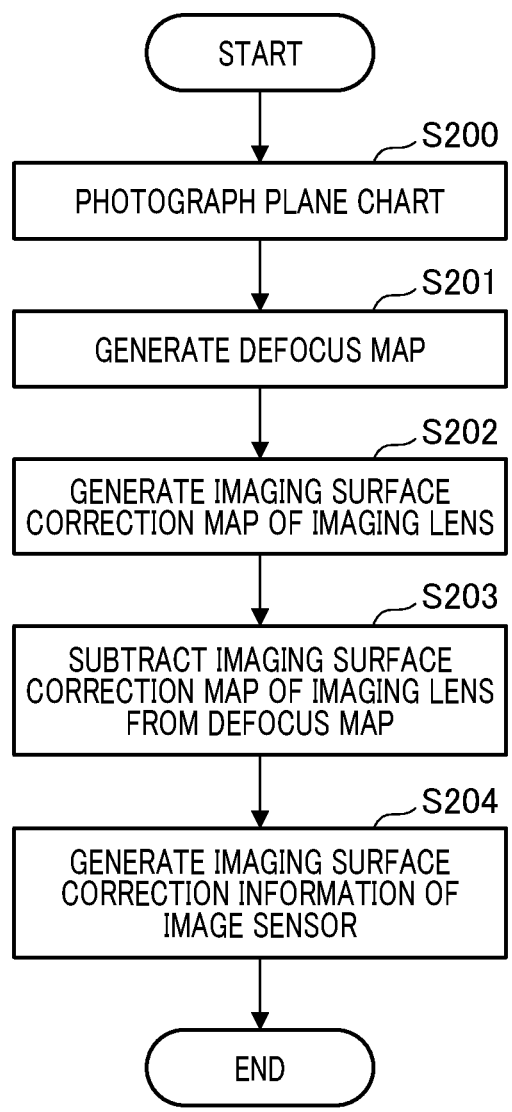
FIG. 7 is a flowchart illustrating an example of a process according to a third embodiment of the present invention.

FIG. 7 is a flowchart illustrating an example of a calculation process for the imaging surface correction information regarding the imaging surface flatness of the image sensor according to the embodiment. As in FIG. 6, the plane chart 601 is disposed in front of the digital camera 1 so that the entire region of a view angle is equidistant. The plane chart 601 is photographed in a state in which the plane chart 601 faces the digital cameral (S200). The system control unit 20 performs a process of generating the defocus map DM of a captured image (S201).

Next, the system control unit 20 communicates with the lens control unit 120 of the imaging lens 3 to acquire the imaging surface correction information regarding a manufacturing error and the optical characteristics of the lens design and generates the imaging surface correction map $ZM_1$ of the imaging lens 3 (S202). The system control unit 20 subtracts the value of the imaging surface correction map $ZM_1$ of the imaging lens 3 from the defocus map DM generated in S201 for each corresponding pixel (S203). The defocus amount after the process of S203 is an amount corresponding to the imaging surface flatness of the image sensor. The system control unit 20 performs a process of approximating the defocus amount after the process of S203 to a flat surface or a curved surface by the least squares method (S204). The coefficient values of the approximated flat surface or the approximated curved surface calculated in S204 are stored in the nonvolatile memory 40.

In the embodiment, it is possible to acquire the imaging surface correction information regarding a manufacturing error and the optical characteristics of the lens design and calculate the imaging surface correction information regarding the imaging surface flatness of the image sensor from the defocus information.

Fourth Embodiment

A method of calculating the imaging surface correction information regarding a manufacturing error and the optical characteristics of the imaging lens will be described according to a fourth embodiment of the present invention. In the embodiment, the imaging surface correction information regarding the imaging surface flatness of the image sensor is assumed to be acquired.

Figure 8:
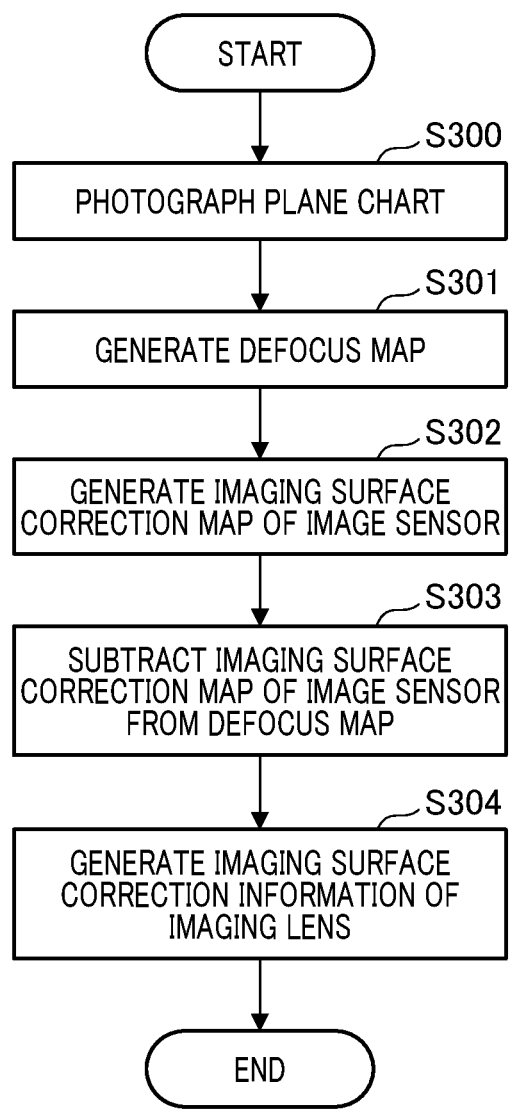
FIG. 8 is a flowchart illustrating an example of a process according to a fourth embodiment of the present invention.

FIG. 8 is a flowchart illustrating an example of a calculation process for the imaging surface correction information regarding a manufacturing error and the optical characteristics of the imaging lens according to the embodiment. As in FIG. 6, the plane chart 601 is disposed in front of the digital camera 1 so that the entire region of a view angle is equidistant. The plane chart 601 is photographed in a state in which the plane chart 601 faces the digital camera 1 (S300). The system control unit 20 performs a process of generating the defocus map DM of a captured image (S301).

Next, the system control unit 20 acquires the imaging surface correction information regarding the imaging surface flatness of the image sensor from the nonvolatile memory 40 and generates the imaging surface correction map $ZM_2$ of the image sensor (S302). The system control unit 20 subtracts the value of the imaging surface correction map $ZM_2$ of the image sensor from the defocus map DM generated in S301 for each corresponding pixel (S303). The defocus amount after the process of S303 is an amount corresponding to the imaging surface characteristics due to a manufacturing error and the optical characteristics of the design of the imaging lens 3.

The system control unit 20 performs a process of approximating the defocus amount after the process of S303 to a curved surface by the least squares method (S304). The system control unit 20 communicates with the lens control unit 120 of the imaging lens 3 and performs control such that the coefficient values of the approximated curved surface calculated in S304 are stored in the nonvolatile memory 140. At this time, the coefficient values of the approximated curved surface calculated in S304 may be stored in the nonvolatile memory 40. Alternatively, the coefficient values of the approximated curved surface calculated in S304 are recorded in the recording medium 4. In this case, the system control unit 20 determines the imaging lens 3 mounted on the camera body. The system control unit 20 can acquire the imaging surface correction information regarding a manufacturing error and the optical characteristics of the design of the imaging lens 3 from the recording medium 4 at the time of the imaging surface correction.

In the embodiment, it is possible to calculate the imaging surface correction information regarding a manufacturing error and the optical characteristics of the imaging lens from the defocus information using the imaging surface correction information regarding the imaging surface flatness of the image sensor.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-121742, filed Jun. 17, 2015, which is hereby incorporated by reference wherein in its entirety.

What is claimed is:

1. An imaging apparatus on which a lens device is able to be detachably mounted, the imaging apparatus comprising:
an imaging unit configured to include a plurality of photoelectric conversion units that receive light fluxes passing through and incident on different pupil regions in an imaging optical system of the lens device and output a plurality of signals;
a calculation unit configured to acquire the signals output by the plurality of photoelectric conversion units and calculate a defocus amount; and
a correction unit configured to correct the defocus amount calculated by the calculation unit,
wherein the correction unit performs imaging surface correction by correcting the defocus amount using an imaging surface correction map generated based on correction information regarding optical characteristics of the lens device and correction information regarding an inclination of an imaging surface of the imaging unit.

2. The imaging apparatus according to claim 1,
wherein the correction unit generates a first imaging surface correction map using the correction information regarding the optical characteristics of the lens device,
generates a second imaging surface correction map using the correction information regarding the inclination of the imaging surface of the imaging unit, and
corrects data of a defocus map indicating a distribution of the defocus amount using a third imaging surface correction map obtained by combining the first and second imaging surface correction maps.

3. The imaging apparatus according to claim 1,
wherein the lens device or a body of the imaging apparatus includes a storage unit storing the correction information regarding the optical characteristics of the lens device.

4. The imaging apparatus according to claim 1,
wherein a body of the imaging apparatus includes a storage unit storing the correction information regarding the inclination of the imaging surface of the imaging unit.

5. The imaging apparatus according to claim 4,
wherein the lens device includes a storage unit storing correction information regarding a manufacturing error or the optical characteristics of the lens device.

6. The imaging apparatus according to claim 3,
wherein the storage unit stores the correction information regarding the optical characteristics of the lens device by combining distance information to a subject and a zoom position related to the lens device.

7. The imaging apparatus according to claim 4,
wherein the correction information regarding the inclination of the imaging surface of the imaging unit is information regarding distances of flange backs of a plurality of spots measured by a ranging meter or a coefficient of a flat surface or a curved surface calculated from the distances.

8. The imaging apparatus according to claim 1,
wherein the calculation unit calculates the defocus amount from a plane chart imaged by the imaging unit, and
wherein the correction unit generates the correction information regarding the inclination of the imaging surface of the imaging unit using the defocus amount calculated from the plane chart by the calculation unit and a correction amount calculated from the correction information regarding the optical characteristics of the lens device.

9. The imaging apparatus according to claim 1,
wherein the calculation unit calculates the defocus amount from a plane chart imaged by the imaging unit, and
wherein the correction unit generates the correction information regarding the optical characteristics of the lens device using the defocus amount calculated from the plane chart by the calculation unit and a correction amount calculated from the correction information regarding the inclination of the imaging surface of the imaging unit.

10. The imaging apparatus according to claim 1, further comprising:
a recording unit configured to record the correction information regarding the optical characteristics of the lens device and the correction information regarding the inclination of the imaging surface of the imaging unit as supplementary information of image data acquired by the imaging unit along with the image data.

11. An imaging apparatus on which a lens device is able to be detachably mounted, the imaging apparatus comprising:
an imaging unit configured to include a plurality of photoelectric conversion units that receive light fluxes passing through and incident on different pupil regions in an imaging optical system of the lens device and output a plurality of signals; and
a calculation unit configured to calculate a defocus amount based on a phase difference between the signals output by the plurality of photoelectric conversion units and an imaging surface correction ma generated based on correction information regarding optical characteristics of the lens device and correction information regarding an inclination of an imaging surface of the imaging unit.

12. A control method performed in an imaging apparatus on which a lens device is able to be detachably mounted, the method comprising:
imaging a subject by an imaging unit including a plurality of photoelectric conversion units that receive light fluxes passing through and incident on different pupil regions in an imaging optical system of the lens device and output a plurality of signals;
acquiring the signals output by the plurality of photoelectric conversion units and calculating a defocus amount; and
performing imaging surface correction by correcting the defocus amount calculated in the calculating of the defocus amount using an imaging surface correction map generated based on correction information regarding optical characteristics of the lens device and correction information regarding an inclination of an imaging surface of the imaging unit.

13. A control method performed in an imaging apparatus on which a lens device is able to be detachably mounted, the method comprising:
  imaging a subject by an imaging unit including a plurality of photoelectric conversion units that receive light fluxes passing through and incident on different pupil regions in an imaging optical system of the lens device and output a plurality of signals;
  calculating a defocus amount based on a phase difference between the signals output by the plurality of photoelectric conversion units and an imaging surface correction map generated based on correction information regarding optical characteristics of the lens device and correction information regarding an inclination of an imaging surface of the imaging unit.

* * * * *